US007206438B2

(12) United States Patent
Corson et al.

(10) Patent No.: US 7,206,438 B2
(45) Date of Patent: Apr. 17, 2007

(54) FEATURE LOCATIONS IN ARRAY READING

(75) Inventors: John F. Corson, Mountain View, CA (US); Glenda C. Delenstarr, San Carlos, CA (US); Nicholas M. Sampas, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 817 days.

(21) Appl. No.: 10/427,652

(22) Filed: Apr. 30, 2003

(65) Prior Publication Data
US 2004/0218793 A1 Nov. 4, 2004

(51) Int. Cl.
G06K 9/00 (2006.01)
(52) U.S. Cl. ..................................... 382/128
(58) Field of Classification Search ........ 382/128–129, 382/309; 702/19–20
See application file for complete search history.

(56) References Cited

U.S. PATENT DOCUMENTS

| | | | | |
|---|---|---|---|---|
| 6,251,601 B1 * | 6/2001 | Bao et al. | ........ | 435/6 |
| 6,349,144 B1 | 2/2002 | Shams | | |
| 6,980,677 B2 * | 12/2005 | Niles et al. | ........ | 382/128 |
| 2002/0195554 A1 | 12/2002 | Staton et al. | | |
| 2003/0087289 A1 * | 5/2003 | Zuzan et al. | ........ | 435/6 |
| 2006/0035220 A1 * | 2/2006 | Tashiro et al. | ........ | 435/6 |

FOREIGN PATENT DOCUMENTS

| WO | WO 99/08233 | 2/1999 |
|---|---|---|
| WO | WO 01/06395 | 1/2001 |

OTHER PUBLICATIONS

Eisen "ScanAlyze User Manual", Stanford University, pp. 1-27, 1998-1999.*
Atilent G2566AA Feature Extraction Software User Manual, Fifth Edition, Sep. 2002, 144 pages.
Gene Expression Slides Presented at Open Meeting, May 2002, 8 pages.

* cited by examiner

Primary Examiner—Daniel Miriam

(57) ABSTRACT

A method of processing one or more detected signal images each acquired from a field of view of a chemical array reader. A location correction is determined based on different detected signals at different image regions which represent regions in the field of view having the same actual signal. Alternatively or additionally, a location correction is applied to a detected signal at an image region. The location correction reduces detected signal discrepancy between different regions in an acquired image which represent different regions in the field of view having the same actual signal. An array reading system and computer program products are also provided.

26 Claims, 7 Drawing Sheets

Z-axis Position with respect to Focal Plane

Solid curves = Response function curves for various actual signals
Dashed lines = positions of multiple scans with respect to the nominal front surface of the slide

FEATURE LOCATIONS IN ARRAY READING

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Biopolymer arrays such as polynucleotide arrays (for example, DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers onto a substrate, or by in situ synthesis methods. The in situ fabrication methods include those described in U.S. Pat. No. 5,449,754 for synthesizing peptide arrays, and in U.S. Pat. No. 6,180,351 and WO 98/41531 and the references cited therein for synthesizing polynucleotide arrays. Further details of fabricating biopolymer arrays are described in U.S. Pat. No. 6,242,266, U.S. Pat. No. 6,232,072, U.S. Pat. No. 6,180,351, and U.S. Pat. No. 6,171,797. Other techniques for fabricating biopolymer arrays include known light directed synthesis techniques.

In array fabrication, the probes formed at each feature is usually are expensive. Additionally, sample quantities available for testing are usually also very small and it is therefore desirable to simultaneously test the same sample against a large number of different probes on an array. These conditions make it desirable to produce arrays with large numbers of very small (for example, in the range of tens or one or two hundred microns), closely spaced features (for example many thousands of features). After an array has been exposed to a sample, the array is read with a reading apparatus (such as an array "scanner") which detects the signals (such as a fluorescence pattern) from the array features. Such a reader should typically have a very fine resolution (for example, in the range of five to twenty microns).

The signal image resulting from reading the array can then be digitally processed to evaluate which regions (pixels) of read data belong to a given feature as well as to calculate the total signal strength associated with each of the features. The foregoing steps, separately or collectively, are referred to as "feature extraction". However, the signal in the image for any particular feature may be very low. Additionally, the present invention recognizes that the ability of the reader to detect signals over a field of view such as an area of a read array, may not be homogeneous. Even small inhomogeneities in signal detection over the field of view can result in significantly different detected signals being obtained from the reader for differently located regions in an array image even when those regions have the same actual signal. This in turn can lead to misinterpretation of the results from the read array with serious consequences in research or diagnosis.

The present invention recognizes then that it would be desirable to provide a means which can reduce discrepancies in read signals which result from inhomogeneity in the reader's field of view.

SUMMARY OF THE INVENTION

The present invention then, provides in one aspect a method of processing one or more detected signal images each acquired from a field of view of a chemical array reader. The method includes determining a location correction based on different detected signals at different image regions which represent regions (different or the same) in the field of view having the same actual signal. Alternatively, the method includes applying a location correction to a detected signal at an image region. The location correction reduces detected signal discrepancy between different regions in an acquired image which represent different regions in the field of view having the same actual signal.

The present invention further provides an array reading system which includes a chemical array reader, and also includes a processor which receives read signals from the reader and executes a method of the present invention. In a still further aspect, the present invention provides a computer program product including a computer readable medium carrying a computer program code which performs a method of the present invention.

Different embodiments of the present invention can provide any one or more of the following or other useful benefits. For example, discrepancies in read signals which result from inhomogeneity in the reader's signal detection field can be reduced.

BRIEF DESCRIPTION OF THE DRAWINGS

Embodiments of the invention will now be described with reference to the following drawings in which.

Figure 1:
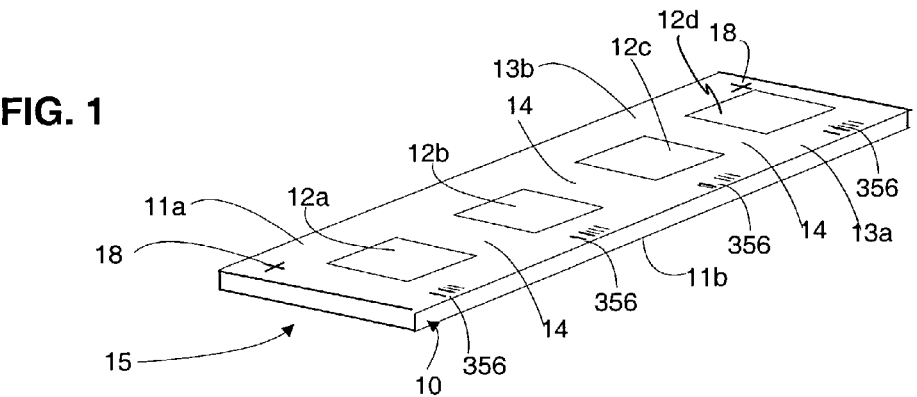
FIG. 1 illustrates a substrate carrying multiple arrays, such as may be read by a method of the present invention.

To facilitate understanding, identical reference numerals have been used, where practical, to designate the same elements which are common to different figures. Drawings are not necessarily to scale. Throughout this application any different members of a generic class may have the same reference number followed by different letters (for example, arrays 12a, 12b, 12c, and 12d may generically be referenced as "arrays 12")

DETAILED DESCRIPTION OF EMBODIMENTS OF THE INVENTION

Throughout the present application, unless a contrary intention appears, the following terms refer to the indicated characteristics.

A "biopolymer" is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. Specifically, a "biopolymer" includes DNA (including cDNA), RNA and oligonucleotides, regardless of the source.

A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides.

An "oligonucleotide" generally refers to a nucleotide multimer of about 10 to 100 nucleotides in length, while a "polynucleotide" includes a nucleotide multimer having any number of nucleotides.

A chemical "array", unless a contrary intention appears, includes any one, two or three-dimensional arrangement of addressable regions bearing a particular chemical moiety or moieties (for example, biopolymers such as polynucleotide sequences) associated with that region. Each region may extend into a third dimension in the case where the substrate is porous while not having any substantial third dimension measurement (thickness) in the case where the substrate is non-porous. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). An array feature is generally homogenous and the features typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). A complete array may be considered to be a group of features. An array may have sub-groups of features which are spaced apart from one another or are spaced apart more than an average inter-feature spacing (if any) within those sub-groups, so as to form sub-groups which are distinct when viewed in an image of the array (enlarged sufficiently so a human eye can see the difference in spacing between sub-groups versus between features). Such sub-groups are referenced herein as "sub-arrays" of the array. Alternatively, there may be no such sub-arrays such as when all the features of the array are regularly spaced from one another. Arrays with no such sub-arrays may be referenced as "continuous" arrays.

An "array layout" or "array characteristics", refers to one or more physical, chemical or biological characteristics of the array, such as positioning of some or all the features within the array and on a substrate, one or more feature dimensions, or some indication of an identity or function (for example, chemical or biological) of a moiety at a given location, or how the array should be handled (for example, conditions under which the array is exposed to a sample, or array reading specifications or controls following sample exposure).

"Hybridizing" and "binding", with respect to polynucleotides, are used interchangeably.

A "plastic" is any synthetic organic polymer of high molecular weight (for example at least 1,000 grams/mole, or even at least 10,000 or 100,000 grams/mole.

"Flexible" with reference to a substrate or substrate web, references that the substrate can be bent 180 degrees around a roller of less than 1.25 cm in radius. The substrate can be so bent and straightened repeatedly in either direction at least 100 times without failure (for example, cracking) or plastic deformation. This bending must be within the elastic limits of the material. The foregoing test for flexibility is performed at a temperature of 20° C.

A "web" references a long continuous piece of substrate material having a length greater than a width. For example, the web length to width ratio may be at least 5/1, 10/1, 50/1, 100/1, 200/1, or 500/1, or even at least 1000/1.

When one item is indicated as being "remote" from another, this is referenced that the two items are at least in different buildings, and may be at least one mile, ten miles, or at least one hundred miles apart. When different items are indicated as being "local" to each other, they are at least in the same building and may be in the same room of a building. "Communicating", "transmitting" and the like, reference conveying data representing information as electrical or optical signals over a suitable communication channel (for example, a private or public network, wired, optical fiber, wireless, or otherwise). Any communication or transmission can be between devices which are local or remote from one another. "Forwarding" an item refers to any means of getting that item from one location to the next, whether by physically transporting that item or using other known methods (where that is possible) and includes, at least in the case of data, physically transporting a medium carrying the data or communicating the data over a communication channel (including electrical, optical, or wireless). "Receiving" something means it is obtained by any possible means, such as delivery of a physical item (for example, an array or array carrying package). When information is received it may be obtained as data as a result of a transmission (such as by electrical or optical signals over any communication channel of a type mentioned herein), or it may be obtained as electrical or optical signals from reading some other medium (such as a magnetic, optical, or solid state storage device) carrying the information. However, when information is received from a communication it is received as a result of a transmission of that information from elsewhere (local or remote).

When two items are "associated" with one another they are provided in such a way that one unambiguously references the other. In particular, an array identifier can be associated with an array by being on the same substrate that carries the array or on or in a package or kit carrying the array. One item of data is "linked" to another when an input of one item unambiguously retrieves the other. In particular, when an array layout is "linked" with an identifier for that array, then an input of the identifier into a processor which accesses a memory carrying the linked array layout unambiguously retrieves the array layout for that array.

A "computer", "processor" or "processing unit" are used interchangeably and each references any combination of hardware or software which can control components as required to execute recited steps and includes. For example a computer, processor, or processor unit includes a general purpose digital microprocessor suitably programmed to perform all of the steps required of it, or any hardware or software combination which will perform those or equivalent steps. Programming may be accomplished, for example, from a computer readable medium carrying necessary program code or by communication from a remote location.

A "memory" or "memory unit" refers to any device which can store information for retrieval as signals by a processor, and may include magnetic, optical, or solid state memory devices. A memory or memory unit may have more than one physical memory device (for example, a memory may have multiple memory devices such as multiple hard drives).

An array "unit" may be the array plus only a substrate on which the array is deposited, although the assembly may be in the form of a package which includes other features (such as a housing with a chamber). "Array unit" may be used interchangeably with "array assembly".

A "signal image" is acquired by reading, such as in a chemical array reader, a signal from a substrate unit, such as an array of an array unit. A signal image may exist solely as a signal data in a memory but may be presented on a display or some other device for human viewing if desired.

"Different image regions" include regions of the same relative location within different images, regions different relative locations in a same image, or regions of different relative location in different images.

"Field of view" is an area as defined with respect to a surface of a substrate which is read by a chemical array reader. The field of view of a reader may be variable in size as determined, within some physical limits, by the scanner software. For example, an array scanner as described below may have an adjustable field of view to accommodate larger arrays up to a maximum size, or smaller arrays down to a minimum size. The field of view may in practice exceed the actual area of an array which is read by the reader to ensure that signals from all features are detected even if the array should be displaced somewhat from an expected position in the reader.

"Inhomogeneities" refers to different image regions within the reader's field of view that have the same actual signal being read by the array reader as having different signals.

"Actual Signal" refers to the signal actually produced. The substrate unit may have regions which produce the same actual signal, such as results from regions which have a same concentration of the species being measured by the reader (for example, dye or fluorophore or chromophore, or whatever material the reader is being used to measure) that should be read as equivalent by the reader. A chemical array reader should ideally provide the same detected signal from regions having the same actual signal. However, due to inhomegeneities in the reader field of view, warping of the substrate, or other factors, the detected signals from regions having the same actual signal may not be the same.

A "substrate unit" references any unit which is being read by the reader. A substrate unit usually has a substrate carrying some species on or in (or both) the substrate which is read. A particular substrate unit is a chemical array unit which includes a substrate an a chemical array. A substrate unit or chemical array unit may be referenced simply as a substrate or chemically array where the context is apparent.

It will also be appreciated that throughout the present application, that words such as "front", "back", "top", "upper", and "lower" are used in a relative sense only.

"May" refers to optionally.

Reference to an array being "displaced" includes rotational or linear displacement in the field of view. Any such displacement can be achieved by physically moving the array (for example, rotationally or linearly) and/or by displacing the field of view (such as by rotating or linearly displacing the field of view) by altering the illumination optics or detection optics, or both, of the reader. For instance any part of the optical system that introduces an inhomogeneity in the field of view could be altered (for example, a lens or array of detectors could be rotated or linearly moved).

Any recited method can be carried out in the order of events recited or in any other order which is logically possible. Reference to a singular item, includes the possibility that there are a plurality of the same item present. All patents and other references cited in this application, are incorporated into this application by reference except insofar as anything in those patents or references, including definitions, conflicts with anything in the present application (in which case the present application is to prevail).

A method of the present invention may additionally include exposing a polynucleotide array to a labeled polynucleotide sample with the location correction being determined from, or applied to, one or more regions in an image of the exposed array acquired from the field of view.

Various techniques of obtaining the different image regions from which the location correction is determined, are possible. In a first such technique those different image regions are on opposite sides of a center of one or more of the images. In a second such technique, images may be acquired from a same substrate, which is rotated at different relative angles in the field of view and may be kept within the focal plane of the reader. In this technique the location correction is determined based on differently located regions in those acquired different images (for example, image regions on opposite sides of a center of one or more of the images), but those regions may correspond to a same position on the substrate. In a third such technique an image may be acquired from a substrate unit having an area of uniform actual signal (such as obtained from a uniform label density, for example chromophore density) over at least part of the surface of the planar substrate. In this third technique the location correction may be determined based on differently located regions in that acquired image. A substrate unit having an area of uniform actual signal covering a planar substrate may be used also to provide the images in the first or second techniques, or instead the sample may be a chemical array on a planar substrate.

The method may additionally include applying the determined location correction to signals from multiple regions of a read array image of a or not that same chemical array provided the different image regions from which the location correction was determined. In any method of the present invention, the location correction may be saved in a memory. Further, any location correction may be a constant factor applied at regions within a particular section of the array, or the location correction may vary with location of a region in an image (for example, linearly). Also, in methods of the present invention where a substrate unit is rotated to acquire different images, the method may include generating an audio or visual prompt for a user to rotate the substrate unit in the chemical array unit between readings of the array unit to obtain the different images.

Methods of the present invention may include performing both the determining of the location correction and applying it to the same or different locations from which the correction was determined. For example, the determining and applying the location correction may include applying a function simultaneously to the different detected signals at different image regions (for example a mathematical average, mean or other function is applied using the different detected signals). For example, if the vignetting of a lens is well-characterized, it can be compensated for in the image by fitting the correction to the measured signal variation.

Signals that are detected for the signal images may be optical signals, such as that resulting from fluorescence, chemiluminescence, electroluminescence, Raman spectroscopy and the like.

As previously mentioned, an array reading system of the present invention may include a chemical array reader and a processor which receives read signals from the reader and executes a method of the present invention. The chemical array reader may include a light source to illuminate a chemical array and may also include a detector to detect light emitted from different regions of the array in response to the illuminating light. The reader may include a holder into which a chemical array unit may be seated and the array thereon read (for example, at each of the different relative angles while being seated in the holder).

Embodiments of methods of the present invention may also include reading the array, and/or extracting feature data from the image based on the determined feature locations. The array image may be obtained from the reading of a chemical array comprising multiple features arranged in rows and columns. The image itself will have feature images arranged in the same pattern as the read array (for example, the rows and columns).

Apparatus of the present invention may include, in addition to the computer, an identifier reader to read an identifier associated with the array and/or an array reader to read the array.

Figure 2:
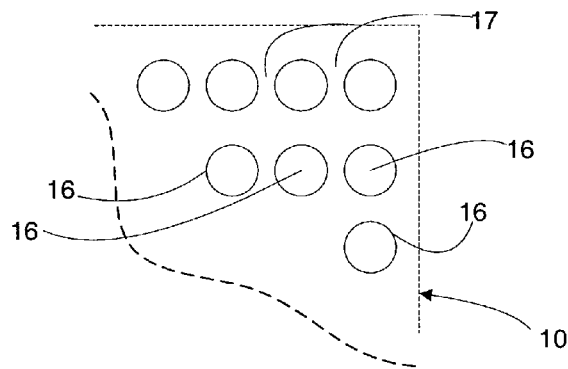
FIG. 2 is an enlarged view of a portion of FIG. 2 showing multiple spots or features of one array.
Figure 3:
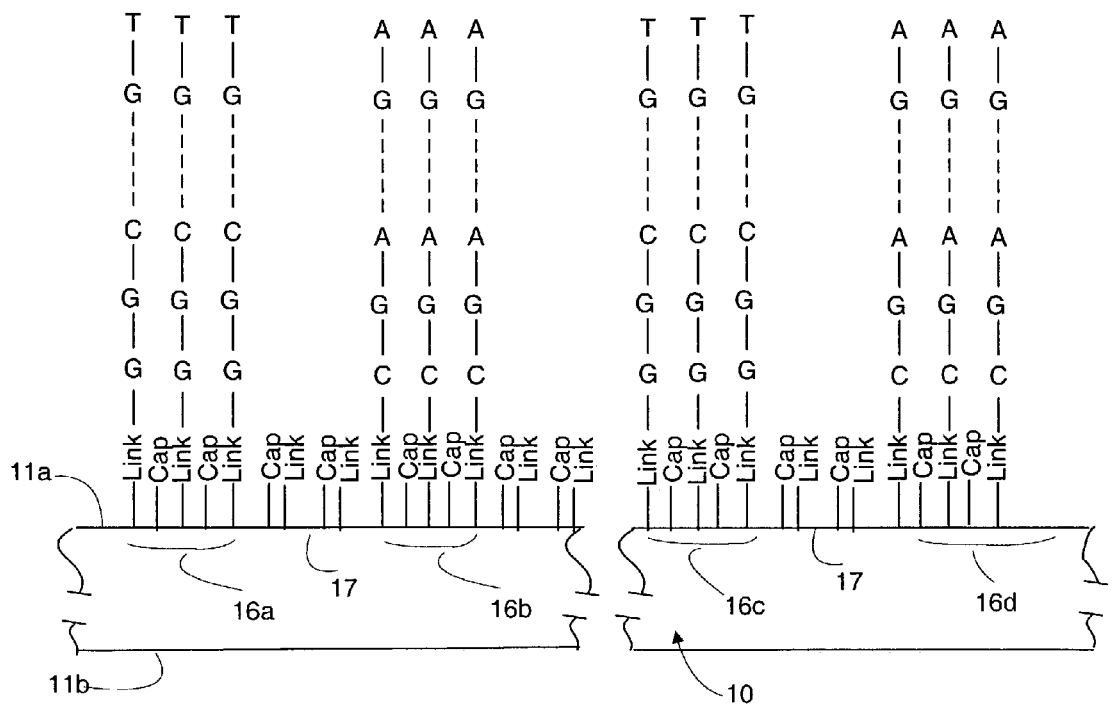
FIG. 3 is an enlarged illustration of a portion of the substrate of FIG. 1.

Referring now to FIGS. 1–3, an array assembly 15 (which may also be referenced as an "array unit") includes arrays 12 which may be read to obtain an array image used in methods of the present invention. Substrate 10 may also be in the form of an a rigid substrate 10 (for example, a transparent non-porous material such as glass or silica) of limited length, carrying one or more arrays 12 disposed along a front surface 11a of substrate 10 and separated by inter-array areas 14. Alternatively, substrate 10 can be flexible (such as a flexible web). The substrate may be of one material or of multi-layer construction. Substrate 10 is typically non-porous, and may be smooth and planar, or have irregularities, such as depressions or elevations (although irregular substrate surfaces may make reading of the exposed array more difficult). However, even a flat planar substrate 10 may have small irregularities in its shape (for example, front side 11a may be slightly bent or bowed). A back side 11b of substrate 10 does not carry any arrays 12. The arrays on substrate can be designed for testing against any type of sample, whether: a trial sample; reference sample; a combination of the foregoing; or a known mixture of polynucleotides, proteins, polysaccharides and the like (in which case the arrays may be composed of features carrying unknown sequences to be evaluated). While four arrays 12 are shown in FIG. 1, it will be understood that substrate 10 may use any number of desired arrays 12 such as at least one, two, five, ten, twenty, fifty, or one hundred (or even at least five hundred, one thousand, or at least three thousand). When more than one array 12 is present they may be arranged end to end along the lengthwise direction of substrate 10. Depending upon intended use, any or all of arrays 12 may be the same or different from one another and each will contain multiple spots or features 16 of biopolymers such as polynucleotides.

A typical array 12 may contain more than: ten, one hundred, one thousand, or ten thousand features. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature of the same composition are excluded, the remaining features may account for at least 5%, 10%, or 20% of the total number of features). The features may have a maximum dimension of between 20 (or 50) to 100 (or 80) microns and be spaced apart by less than 130 microns (or by less than 100 or 50 microns). Various feature densities on the substrate surface are possible. For example, features having a maximum dimension greater than any of the foregoing figures may be present on the surface of at least 30 features/mm$^2$, 40 features/mm$^2$, or 60 features/mm$^2$. While round features 16 are shown, various other feature shapes are possible (such as elliptical). The features 16 may also be arranged in other configurations (for example, hexagonal or circular) rather than the rectilinear grid illustrated. Similarly, arrays 12 on a same substrate 10 need not be laid out in a linear configuration.

Each array 12 may cover an area of less than 100 cm$^2$, or even less than 50 cm$^2$, 10 cm$^2$ or 1 cm$^2$. In many embodiments, particularly when substrate 10 is rigid, it may be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. When substrate 10 is flexible, it may be of various lengths including at least 1 m, at least 2 m, or at least 5 m (or even at least 10 m). With arrays that are read by detecting fluorescence, the substrate 10 may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, substrate 10 may transmit at least 20%, or 50% (or even at least 70%, 90%, or 95%), of the illuminating light incident on the front as may be measured across the entire integrated spectrum of such illuminating light or alternatively at 532 nm or 633 nm.

In the case where arrays 12 are formed by the conventional in situ or deposition of previously obtained moieties, as described above, by depositing for each feature a droplet of reagent in each cycle such as by using a pulse jet such as an inkjet type head, interfeature areas 17 will typically be present which do not carry any polynucleotide. It will be appreciated though, that the interfeature areas 17 could be of various sizes and configurations. Further, such interfeature areas 17 need not be present at all (such as when arrays are fabricated using light directed synthesis techniques). Where interfeature areas 17 are present, the features 16 may be spaced apart by a distance greater than 0 and less than 70%, 60% 50%, 25%, or 10% of a maximum dimension of the feature. Each feature 16 carries a predetermined polynucleotide (which includes the possibility of mixtures of polynucleotides). As per usual, A, C, G, T represent the usual four nucleotides. "Link" (see FIG. 3 in particular) represents a linking agent (molecule) covalently bound to the front surface and a first nucleotide, as provided by a method of the present invention and as further described below. The Link serves to functionalize the surface for binding by the first nucleotide during the in situ process. "Cap" represents a capping agent. The Link may be any of the "second silanes" referenced in U.S. Pat. No. 6,444,268 while the Cap may be any of the "first silanes" in that patent. However, different linking layer compositions than those silanes could be used. As already mentioned, the foregoing patents are incorporated herein by reference, including for example the details of the linking layer compositions used therein.

Substrate 10 also has one or more identifiers 356 each in the form of a bar code. Identifiers 356 may be associated with an array by being: directly printed onto the substrate 10 or a housing (not shown) carrying substrate 10; printed onto labels attached to substrate 10 or a housing carrying substrate 10; contained in a memory (for example, a solid state memory) attached to substrate 10 or a housing carrying substrate 10; or be provided on a printed label or paper or some other medium or in a memory, any of which is received in or on a same package containing the array unit 15 (and therefore also containing substrate 10). Identifiers such as other optical or magnetic identifiers could be used instead of bar codes, and which will carry the information discussed below. Each identifier may be associated with its corresponding array by being positioned adjacent that array 12 on the same substrate 10. However, this need not be the case and identifiers 356 can be positioned elsewhere on substrate 10 if some other means of associating each identifier 356 with its corresponding array is provided (for example, by relative physical locations). Further, a single identifier might be provided which is associated with more than one array 12 on a same substrate 10 and such one or more identifiers may be positioned on a leading or trailing end of substrate 10. Each identifier 356 may also be associated with an array by being in or on a same package or kit which contained by the array and is received by a user. The substrate may further have one or more fiducial marks 18 for alignment purposes during array fabrication or reading.

FIGS. 2 and 3 illustrate ideal features 16 of an array 12 where the actual features formed are the same as the desired (or "aim") features, with each feature 16 being uniform in shape, size and composition, and the features being regularly spaced. Such ideally shaped features may not always be possible to obtain but this is not critical in any event. Suitable drop deposition methods for fabricating arrays 12 include those as described in U.S. Pat. No. 6,180,351, U.S. Pat. No. 6,242,266, U.S. Pat. No. 6,306,599, and U.S. Pat. No. 6,420,180. As mentioned above, foregoing references are incorporated herein by reference particularly as relates to the in situ fabrication apparatus and methods disclosed therein. Alternatively, arrays 12 can be fabricated by known light directed synthesis methods.

Figure 4:
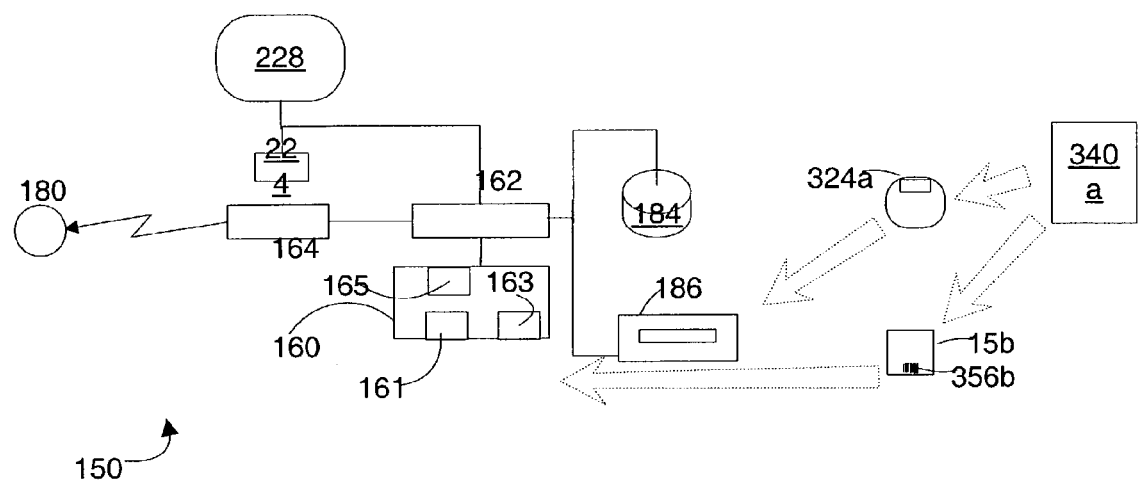
FIG. 4 is a schematic diagram of a chemical array reader of the present invention.

Referring now to FIG. 4, an apparatus of the present invention is illustrated in the form of an array reader 150 for processing an array 12. Reader 150 may be remote from a fabrication station at which the array was fabricated. Reader 150 includes a memory 184, an array reader section 160 which can read an array, data writer/reader 186, a communication module 164 which has access to communication channel 180, and a processor 162 communicating with and controlling each of the foregoing. Data writer/reader 186 may be any suitable device which can at least read (and optionally also write onto) a portable memory (such as a magnetic diskette, optical CD or DVD disk, or memory chip). Communication module 164 may be any type of suitable communication module, such as a telephone modem, LAN or WAN card, satellite modem, optical modem, or otherwise. Processor 162 can be programmed from any computer readable medium carrying a suitable computer program. For example, such a medium can be a memory device read by writer/reader 186 or may be programmed from a remote location through communication channel 180. Array reader section 160, processor 162, module 164, memory 184, and data writer/reader 186 are also generally local to one another but any combination of one or more of them could be remote from the others or they could all be remote from one another.

Array reader section 160 may include a holder 161 which receives and holds an array unit 15, as well as a source of illumination (such as a laser) and a light detector 165 to detect fluorescent light signals from respective features on the array. Reader section 160 can be any suitable apparatus for reading an array, such as one which can read the location and intensity of fluorescence at each feature of an array following exposure to a fluorescently labeled sample. An array reader section 160 may be a scanner which scans one or more illuminating laser beams across each array in raster fashion and any detects any resulting fluorescent signals, such as described in detail in U.S. Pat. Nos. 6,406,849, or 5,585,639 ("Optical Scanning Apparatus". One such scanner that may be used for this purpose is the AGILENT MICROARRAY SCANNER manufactured by Agilent Technologies, Palo Alto, Calif. Readers of the foregoing type have a field of view and may also have an autofocus mechanism such as described in U.S. Pat. No. 6,486,457. However, arrays may be read by any other method or apparatus, than the foregoing, such as those described in U.S. Pat. Nos. 5,900,949 or 6,084,991 ("A CCD Imager for Confocal Scanning Microscopy"). Also, other reading methods may be used which include other optical techniques (for example, detecting chemiluminescent or electroluminescent labels) or imaging methods other than scanning detection of the substrate unit. Reader section 160 also includes an identifier reader 163 to read an identifier, such as identifier 356, appearing on each array unit 15 to be read. Identifier reader 163 may automatically read each array identifier as that array is loaded into reader 160 or it may be a manually operated wand or the like which an operator passes over each identifier 356. The components of reader section 160 may all be contained within the same housing of a single same apparatus. The reader 150 of FIG. 4 further includes a display 228 and user input device 224.

The apparatus of FIG. 4 can be used to execute a method of the present invention when processor is capable of carrying out the events required of it (for example, by being suitably programmed to do so). This will typically involve determining a location correction (although methods of the present invention may simply use a previously determined location correction). A location correction may be based on a detected signal discrepancy between different image regions which represent different regions in the field of view of the reader which have the same actual signal. This process can be understood with reference to FIGS. 5–10 in particular.

Figure 5:
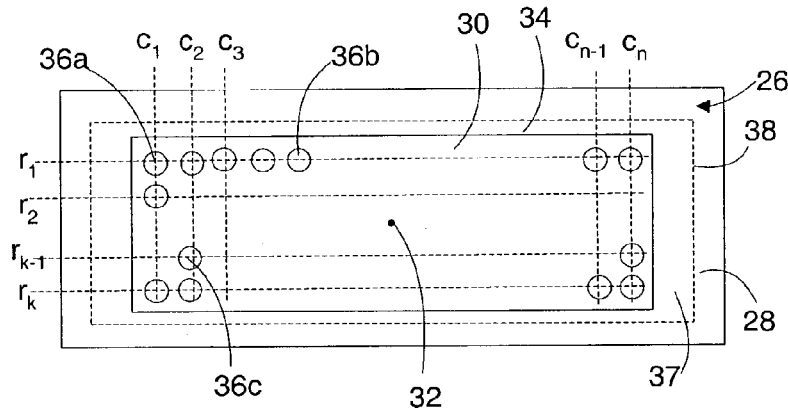
FIG. 5 shows a substrate unit, such as a chemical array unit, which will be read by the reader of FIG. 4

Considering first FIG. 5 this shows a view of a substrate unit 26 having a substrate 28 carrying a single layer covering an area 30 having an outer boundary 34. Substrate 28 is of the same dimensions and materials as substrate 10 of an array unit 15 which will be read by the array reader 150. In fact area 30 may be an array 12 which has been exposed to a fluorescently labeled sample. Alternatively, area 30 may be an area of uniform actual signal, such as an area coated with a uniform layer carrying fluorescent material having fluorescent emission spectra similar to that of a labeled sample such that fluorescent signals from both can be detected by array reader 150. A test substrate having such a suitable area of uniform actual signal is described in detail in U.S. patent application Ser. No. 10/008598 titled "Devices For Calibrating Optical Scanners And Methods Of Using The Same", filed Dec. 4, 2001, which is incorporated herein by reference. If area 30 is an array 12 then different regions 36 may be features 16. If area 30 is a uniform signal area then regions 36 may simply be arbitrary selected regions on that area 30 which may or may not be the same size as features 16. In FIGS. 5 to 10 the regions 36 will be identified by means of column number followed by row number. For example, region 36a may be referenced as region $c_1 r_1$ and region 36c as $c_2 r_{k-1}$. There may be other regions between those illustrated. Area 30 has a center 32.

Figure 6:
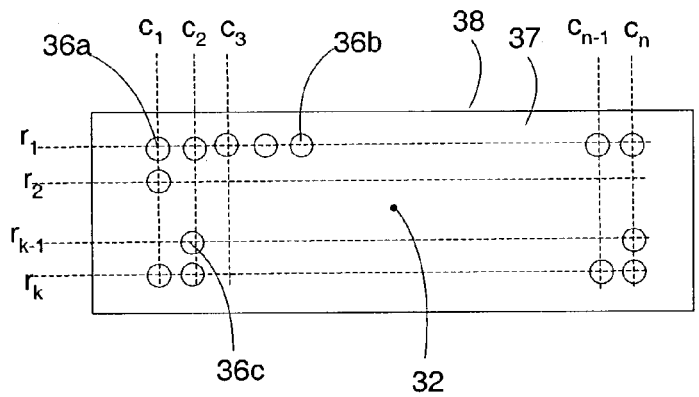
FIG. 6 is the acquired image from the reading.

An image acquired by reader 150 from substrate unit 26 would, when displayed to a user, appear as in FIG. 6. FIG. 6 appears essentially the same as FIG. 5 except the image has a field of view 37 during the capture of the image which has an outer boundary 38. The field of view 37 will typically extend beyond boundary 34 and may even extend beyond the edge of substrate 28. Different image regions which represent different regions in the field of view 37 having the same actual signal, and from which a location correction can be determined, can be acquired by a number of methods.

In a first one of such methods if all regions 36 are known to have the same actual signal then the single image of FIG. 6 alone can provide the different image regions. For example, if area 30 is a uniform signal area of the type described above then detected signals from any of the different regions in FIG. 6 can serve as the different image regions from which a location correction can be determined since they represent regions known to all have the same actual signal. If the detected material on the substrate unit is a layer of uniform actual signal then the regions 36 shown as circles in FIG. 6 should be thought of as regions to be considered and not regions of different actual signal.

Figure 7:
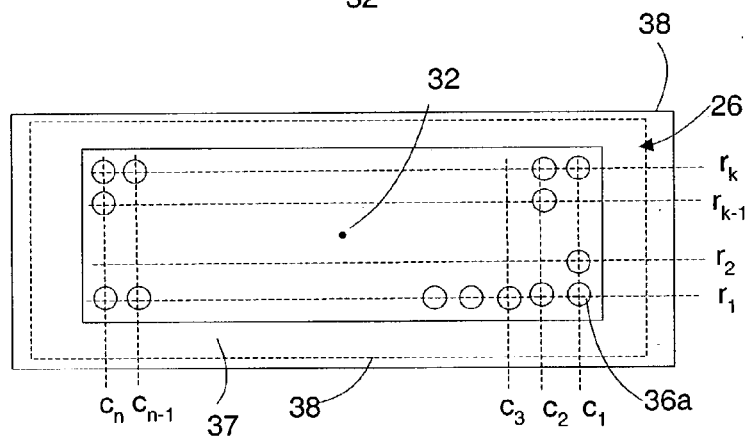
FIG. 7 shows a substrate unit displaced in the array reader's field of view according to one method and FIG. 8 is the acquired image from reading the displaced substrate unit.
Figure 8:
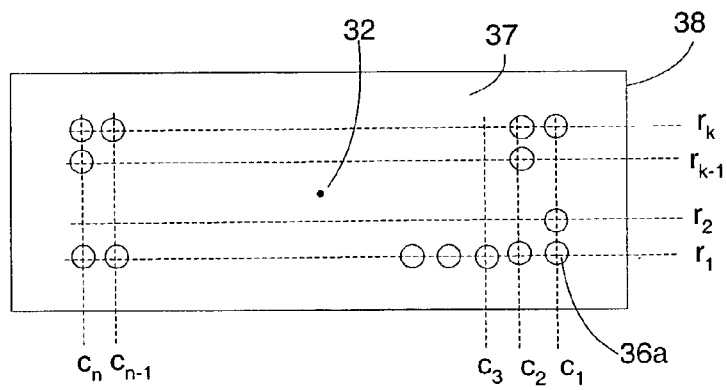

In a second one of such methods, different images may be acquired of substrate 26 at different displacements within the field of view 37. This method is particularly suited to the situation where substrate unit 26 is an array unit 15 since the actual signals in different regions of the field of view 37 will not be known to be uniform. One way of obtaining this displacement is to capture the different images of the same substrate unit rotated at different angles relative to one another in the field of view 37. For example one image (such as that of FIG. 6) may be acquired when substrate unit 26 is positioned in holder 161 in one position (such as that of FIG. 7), the substrate unit 26 displaced in holder 161 so that it is positioned as shown in FIG. 7 (rotated 180 degrees from FIG. 6), and the image shown in FIG. 8 then acquired. In this case regions which are on opposites sides of a center 32, such as regions 36a in FIGS. 6 and 8, may be used as the different image regions from which a location correction is determined, since they represent regions in the field of view 37 known to have the same actual signal.

Figure 9:
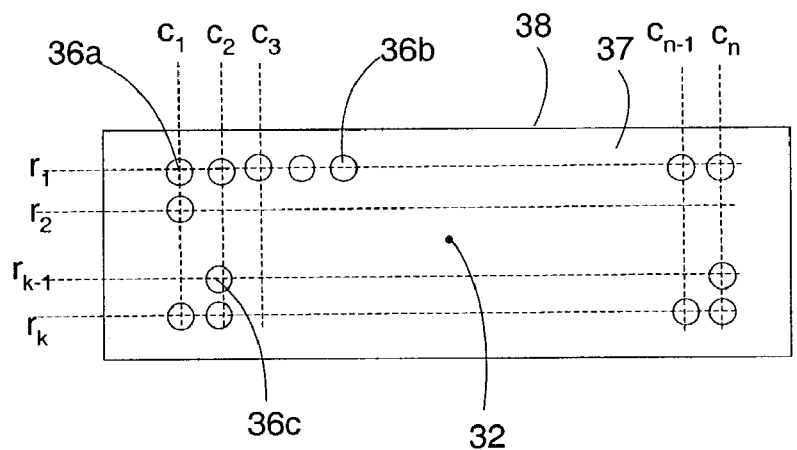
FIGS. 9 and 10 are acquired images illustrating another means of obtaining a substrate unit displacement in the array reader's field of view.
Figure 10:
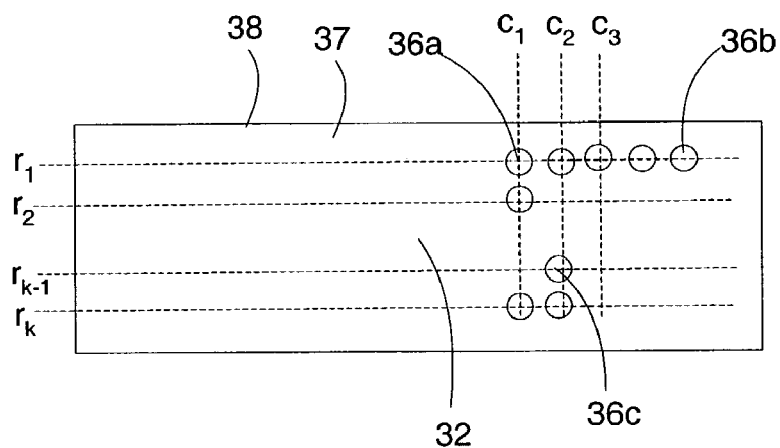

Another way of obtaining the displacement is illustrated in FIGS. 9 and 10. FIG. 9 is an image acquired of the substrate unit 26 of FIG. 5 in one position in holder 161, and FIG. 10 is a similar image acquired after linearly displacing (by sliding) the substrate unit 36 to another position in holder 161. In this case different image regions which represent regions in the field of view having the same actual signal are those regions which are linearly displaced in the image by an amount corresponding to the linear displacement of substrate unit 26 in holder 161. Thus, for example, region $c_2 r_1$ in the different images of FIGS. 9 and 10 could be used as the different regions from which a location correction is determined.

Any displacement between image acquisitions may be automatic when the array reader 150 includes a transport (not shown) which can suitably move the substrate unit 26. In this case processor 162 would control such a transport to cause the displacement between image acquisitions. Alternatively, the displacement could be manually accomplished. In this case processor 162 could provide an audio or visual prompt (for example, using display 228) to a user to perform the required displacement of substrate 26 in the chemical array unit between readings of the array unit to acquire the different images.

Different methods can be used to determine a location correction from the detected different image regions, which represent different regions in the field of view having the same actual signal. For example, for different regions a, b representing regions in the field of view having the same actual signal, the difference of detected signals can be calculated as:

$$d_a = (S_a - S_b)/(S_a + S_b) \qquad (1)$$

The inverse of one plus this difference ($d_a$) can then be applied as a location correction for region a in the field of view of the array reader by multiplying the detected signal at region a in any read array by $1/(1+d_a)$. This can be repeated for as many different regions as desired. For example, if different arrays to be read will have an array layout with n columns and k rows of features, then this can be repeated for each region in the field of view aligned with each feature. Thus, a table of location corrections can be determined depending upon location in the field of view 37 of array reader 150. Alternatively, a location correction may be determined which is expressed as an equation, which varies with location in the field of view 37. For example the location correction could be a polynomial of form:

$$A(x+y)+B(x+y)^2+C(x+y)^2+\ldots+D(x+y)^n$$

Where x and y may represent displacements in the x and y directions in the plane of an array from a corner of the array. Other functions can be used based on an observed pattern of detected signal variation from different image regions, which represent the different regions in the field of view having the same actual signal.

In the case where the inhomogeneity of the reader doesn't vary from one substrate unit to the next, one method that could be used is to image a substrate unit with a uniform signal producing layer to measure the inhomgeneity of the reader. In this case, the entire layer has the same actual signal and the signal from any region a, can be compared to the average of the entire layer. For example, the difference of detected signals at a and the rest of the layer can be calculated as:

$$d_a=(S_a-S_{ave})/(S_{ave}), \qquad (2)$$

where $S_{ave}$ is the mean signal over the entire layer within the field of view. The inverse of one plus this difference ($d_a$) can then be applied as a location correction for region a in the field of view of the array reader by multiplying the detected signal at region a in any read array by $1/(1+d_a)$. Of course, in the preceding method the layer from which signal is detected should be uniform, that is it has a uniformity in actual signal which is very much greater than that of the field of view of the reader.

If the substrate unit has a layer which is non-uniform (that is, has a uniformity which is less than the field of view of the reader) this method (2) can be modified slightly to remove the difference in actual signal due to the non-uniformity of the layer. The layer is measured twice with a displacement (i.e. a 180-degree rotation) in between the two images being measured. Region a is any particular region of the layer and its signal from the first image is $S_{a1}$. The signal from region a from the second image is $S_{a2}$. Likewise for region b. Further, region a, of the layer, is in the same region of the field of view in image 1 as region b is in the second image. Then the extent to which the layer doesn't have exactly the same actual signal in all regions of the layer can be estimated for each region a as:

$$D_a=(S_{a1}-S_{b1})-(S_{b2}-S_{a2})/(2*[S_{ave1}+S_{ave2}]) \qquad (3)$$

where $S_{ave1}$ and $S_{ave2}$ are the average signals over the entire layer in the field of view from image 1 and 2, respectively. Here $D_a$ is the difference from the average for region a of the layer in actual signal for the substantially uniform layer. Therefore, all images of this substrate used to determine a $d_a$ value as described above in equation (2) can first be corrected by multiplying the signal, $S_a$, from any region, a, by the correction $1/(1+D_a)$, before entering it into to the formula shown in eq. (2). Therefore eq. (2) would become, $$d_a=[(S_a/(1+D_a)-S_{ave}]/(S_{ave}) \qquad (4)$$

While the methods described above [(1), (2), and (3)] assume two images are generated, this can be generalized to more than two images. These images can include any combination of rotation and/or linear displacement of the substrate unit and/or field of view as is thought to be useful for that reader. Many further variations are possible. Of course, with a non-uniform layer there should be sufficient regions with a sufficient signal level (for example, at least 10, 100 or 1000 times the lower limit of detection) which will provide information on a useful proportion of the field of view.

Additionally, both the determining of the location correction and applying it to the same or different locations from which the correction was determined can be performed at the same time in one operation. For example, the determining and applying the location correction may include applying a function (such as a mathematical average) simultaneously to the different detected signals at different image regions which represent different regions in the field of view having the same actual signal. The different image regions in this case can be obtained from a chemical array being read, by displacing the array (such as by rotation) between image captures as described herein, and for each feature taking a mathematical average of the signals for that feature in the image captures.

A user may receive a package 340a at a location of reader 150 (or another location remote or not to reader 150). Package 340a contains an array unit and optionally a portable memory 324a (such as a disk) in package 340a only. A "package" in this context is one or more array units optionally with other items, all held together (such as by a common wrapping or protective cover or binding). Normally the common wrapping will also be a protective cover (such as a common wrapping or box) which will provide additional protection to the substrate 10 from exposure to the external environment. In the case of just a single array unit the package may be that array unit with some protective covering over the array 12 and substrate 10 (which protective cover may or may not be an additional part of the array unit 15 itself).

The user exposes each array 12 on the array unit 15 to a sample, for example a test sample derived from a human or other organism or source. Samples can be prepared for exposure to an array 15 using methods such as described in U.S. Pat. Nos. 6,235,483 or 6,132,997. Array washing and drying can be accomplished in a known manner.

Figure 11:
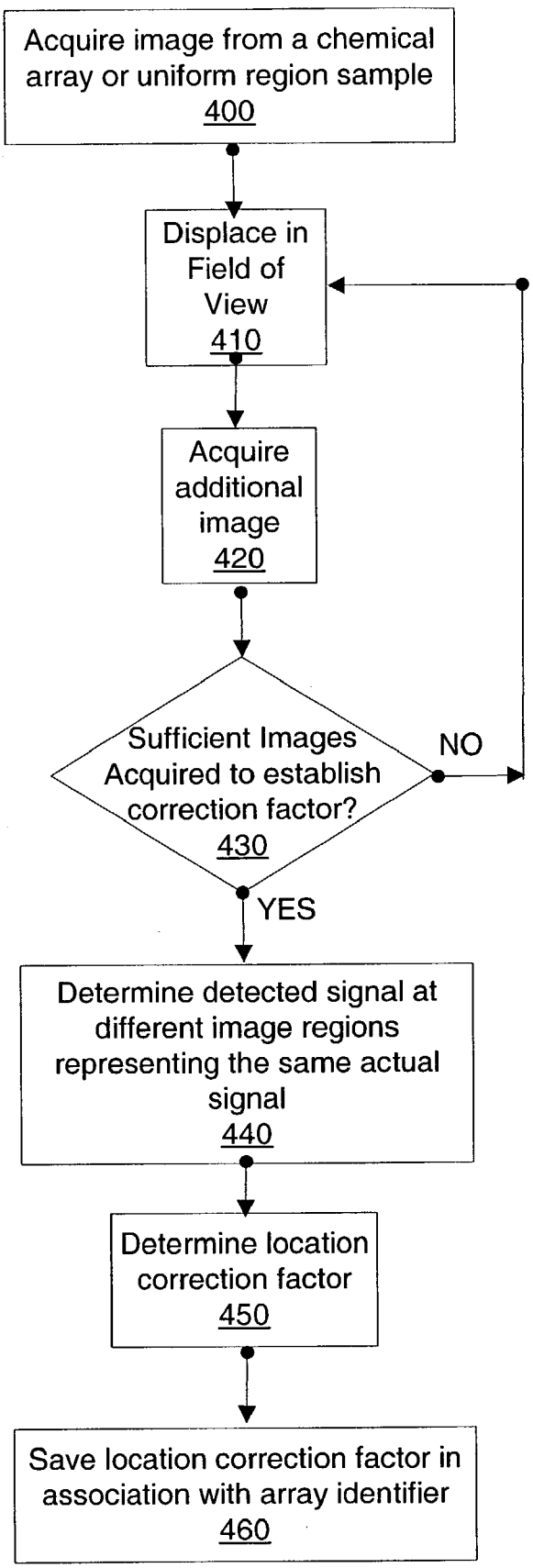
FIGS. 11 and 12 are flowcharts illustrating methods of the present invention.

Referring to FIG. 11 a method of the present invention is illustrated which can be implemented on the array reader 150 described above, and in accordance with the details of the methods further explained above. Reference numerals in parentheses refer to FIGS. 11 and 12. All steps may be executed by the reader under command of processor 162 except where substrate unit displacement in holder 161 is manual. In particular, an image from a chemical array, or layer of another substrate unit with a region of uniform actual signal, may be acquired (400). If a substrate unit with a region of uniform actual signal is used steps (410 to 430) can be skipped. If not, the substrate unit can be displaced (410) in the field of view using any of those methods already described (for example, rotational or linear displacement in holder 161) and an additional image acquired (420). These steps (410 to 430) can be repeated if it is determined (430) that additional images are needed to establish a correction factor. Detected signals are then determined (440) in different image regions which represent different regions in the field of view having the same actual signal. These different image regions may be from the same image or from different images. A location correction is determined (450) and may be saved (460) in a memory, optionally linked with an array identifier 356 (so as to effectively be saved in memory linked with an array layout or a class of array layouts). The array identifier 356 may be read at any time during the method.

Figure 12:
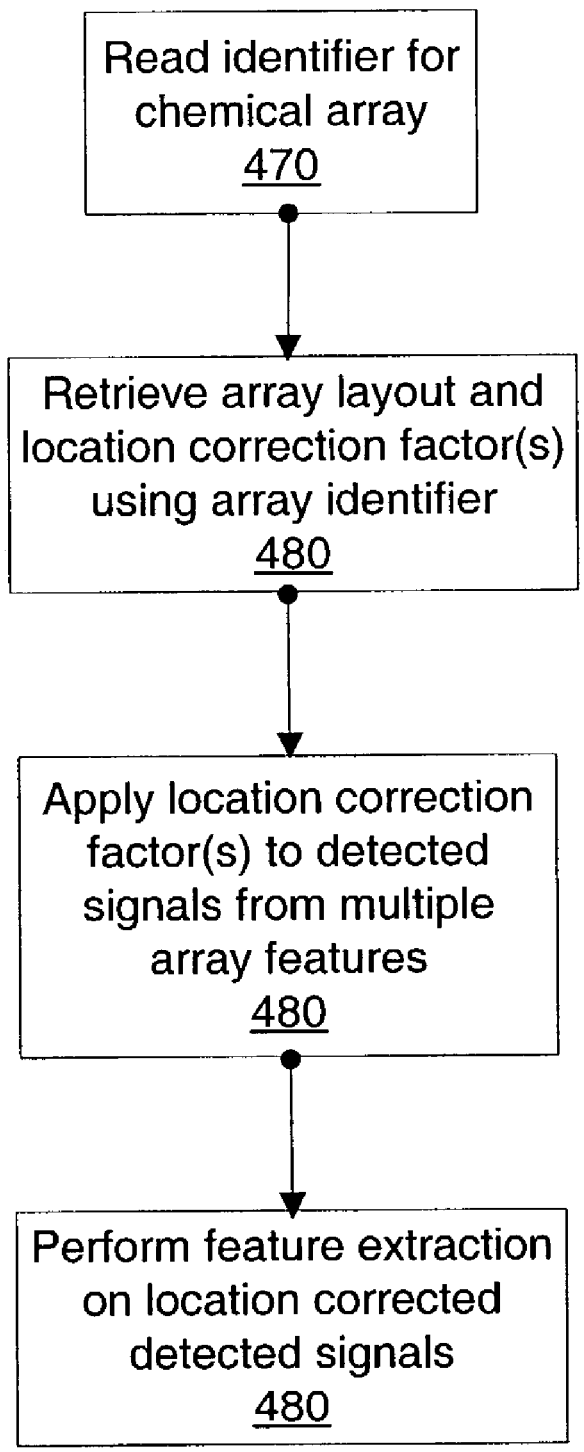

A user may perform the procedure of FIG. 11 at array reader 150. However, the procedure of FIG. 11 may be performed at an array fabrication station or other location remote from a user at an array reader 150, using another array reader having an array reading section 160 with the same optical characteristics as array reader 150 (both array readers may be the same). When the procedure of FIG. 11 is performed at array reader 150, the determination and application of the location correction factor can be performed simultaneously for each feature. In any event, the sequence illustrated in FIG. 12 is performed at array reader 150. In particular the identifier 356 is read (470) and the array layout is retrieved (480) from a remote or non-remote location using the read identifier. The location correction may also be retrieved (480) from a remote or non-remote location. However, the retrieving of the location correction may not be needed where the procedure of FIG. 11 was performed at array reader 150 (rather than at a remote location). The location correction can then be applied (480) to detected signals from multiple array features in an array image. The array image to which the location correction is applied may be the same or different from that used to determine the location correction. Further, as described above, the determination of the location correction and its application may be performed simultaneously on each feature of an array. For example, the array may be displaced (such as by rotation as mentioned above) between image captures and the signal for each feature in the different images is averaged (or another mathematical function applied simultaneously to those signals). In a first situation where inhomogeneity in the field of view result significantly from factors that vary between array units (for example, variable substrate warping), then it will usually be best to both determine and apply the location correction to the same chemical array unit 15. This could be, for example, done using method (1). In a second situation where the inhomogeneity results from factors that vary between array readers (usually variable optical properties) then the location correction should be determined on the same reader from which detected signals from an array are to be corrected. This could be done, for example, using method (2) or (3). In a third situation where the inhomogeneity is relatively unchanged across a batch of arrays or primarily results from fixed optical properties of the array reader, the location correction can be determined remotely and provided to the user (for example, in a database linked to the array identifier) or the user can determine the location correction factor and optionally re-check it from time to time.

An additional method of the present invention uses the overscanning by multiple images being made at different displacements along the azimuthal direction (or z-axis direction, where the z-axis is defined as along the axis of the light collection optics and is at an angle to a surface of a substrate being read, such as between 40 to 90 degrees to that surface). This method allows a reader such as a scanner, without substrate autofocus, to perform nearly as well as one with an autofocus. The "cost" of this improved performance (improved in terms of the uniformity of the actual measurements) is increased scan time (in that multiple scans are required), and in possibly increased photobleaching of chromophores on the substrate. However, quantum-dot particles could be used to reduce this effect since they are particularly insensitive to photobleaching, and also benefit by the application of multiple fast scans, as quantum-dots tend to photoquench (temporarily go dark), but not photobleach. However there is an improvement in scans in two essential respects: first, by appropriate signal processing, a calculated peak in the measured signal corresponding a good representation of the actual signal (or to the label quantity on the surface) can be made. Second, because multiple scans are made the best of these can be averaged to give a more accurate reading of the actual signal than any single scan can.

Figure 13:
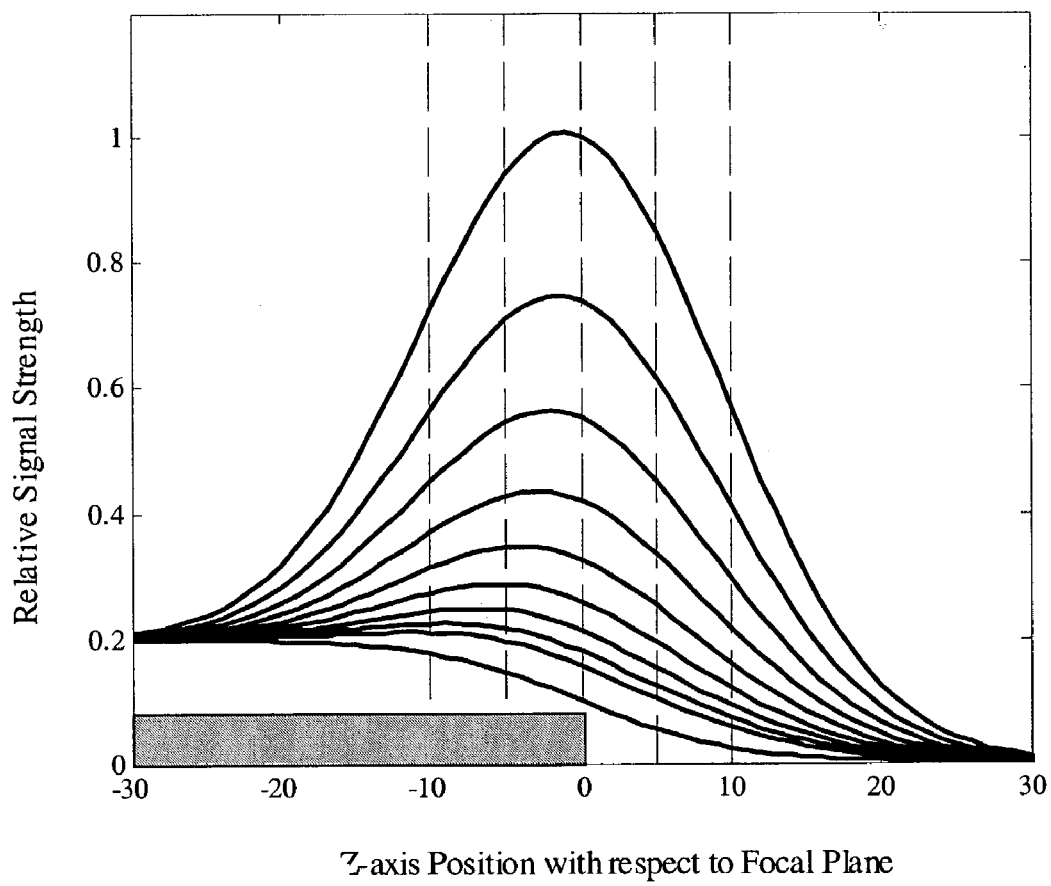
FIG. 13 illustrates a series of calibrations graphs used in another method of the present invention.

The operation of this additional method can be understood from FIG. 13. A response function of an array reader, such as a scanner, can be characterized by reading a substrate which carries regions (for example, features) of different actual signal such as provided by fluorescent labels. The substrate properly oriented in the holder with respect to the scanner coordinates is scanned at multiple, positions displaced with respect to one another on the z-axis (and therefore displaced with respect to one another from a focal plane of the reader). The actual number of different positions may be selected based on the relevant tolerances and making the usual engineering trade-offs (such as total scan time). For example, at least three, five, or eight positions, and up to eight or ten. FIG. 13 shows the detected signal from each of ten regions on the substrate at the different positions of the substrate on the z axis, each of the ten regions having a different actual signal. The lowest curve in FIG. 13 represents the signal level that would be measured from a blank substrate, where only the background from the substrate is observed. The remaining curves represent signals increasing in actual signal at the surface of the slide. However, if the substrate is not flat and a region is displaced in the z-axis position from the focal plane, for example due to warping of the substrate or thermal variability of the scanning apparatus, then the maximal signal will be displaced from the region which might be otherwise be indicated by FIG. 13.

Once the response function of the scanner is characterized, then a family of signal-dependent curves can be calculated for a series of detected signals obtained from a same region displaced at different positions on the z-axis. When another substrate is read at various displaced positions on the z-axis, the series of detected signals for each read substrate region can be compared to the curves of the family and a curve selected which is the best fit. For example, if a substrate is scanned five times, then a series of five data points for each pixel (i,j) is obtained. For each pixel a curve is selected from the family which is the best fit for that series. The known actual signal value for that curve is then assigned to the pixel as the corrected signal value for that pixel. In this manner a location correction factor can be simultaneously determined and applied. Only this corrected signal value need be saved in memory as the final determined signal for that pixel. In this method then, the location correction is determined from, or applied to, (or both) different detected signals at different image regions acquired from a same substrate displaced at different positions with respect to a focal plane of the reader. Thus, these different image regions represent the same regions in the field of view.

In the foregoing additional method, where the substrate can be substantially distorted, for example a flexible polymer surface, it may be beneficial to make a larger number of scans (for example 10) of the substrate displaced at different z axis positions, and reduce the series of data actually fitted to a curve to that obtained from a smaller number (for example 5) consecutive (in terms of position, not time) scans.

The results from the method will be a corrected image carrying location corrected detected signals (that is, detected signals which have been corrected for inhomogeneities in the array reader's optical pathway). The results may be "raw" results in which, for example, the corrected detected signal values are provided. Alternatively, the results may be processed results in which, for example, an assessment is made based on the corrected detected signal values if one or more targets is present in a sample or whether an organism from which the sample was obtained exhibits a particular condition (for example, cancer). This can be readily done in the case where two samples are obtained from an organism of the same type where one sample is from an organism exhibiting a particular condition relative to the other (for example, cancerous versus normal tissue). The two samples are labeled with different labels, providing two different targets for the array. Further, the results could include the location corrections determined using the image and also any location correction used to alter the image. The results of the reading (processed or not) may be transmitted to a remote location at which they are received, and can be re-transmitted to elsewhere from that location as desired.

Various further and modifications to the particular embodiments described above are, of course, possible. Accordingly, the present invention is not limited to the particular embodiments described in detail above.

What is claimed is:

1. A method of processing one or more detected signal images each acquired from a field of view of a chemical array reader, comprising: determining a location correction based on different detected signals at different image regions which represent regions in the field of view having the same actual signal, or applying a location correction to a detected signal at an image region, the location correction reducing detected signal discrepancy between different regions in an acquired image which represent different regions in the field of view having the same actual signal.

2. A method according to claim 1 additionally comprising exposing a polynucleotide array to a labeled polynucleotide sample and wherein the location correction is determined from, or applied to, one or more regions in an image of the array acquired from the field of view.

3. A method according to claim 1 additionally comprising acquiring images from a same substrate at different positions in the field of view, and wherein the location correction is determined based on differently located regions in those acquired different images.

4. A method according to claim 1 additionally comprising acquiring images from a same substrate unit rotated at different relative angles in the field of view, and wherein the location correction is determined based on differently located regions in those acquired different images.

5. A method according to claim 4 wherein the same substrate unit comprises a chemical array on a planar substrate.

6. A method according to claim 4 wherein the same substrate unit has an area of uniform actual signal on a planar substrate.

7. A method according to claim 4 wherein the substrate unit comprises an array on a planar substrate, the method additionally comprising applying the determined location correction to signals from multiple further regions of a read array image of the same array.

8. A method according to claim 4 wherein the reading comprises detecting an optical signal.

9. A method according to claim 8 wherein the reading comprises detecting a fluorescence signal.

10. An array reading system comprising: a chemical array reader comprising a holder, and a processor which receives read signals from the reader and executes a method of claim 4; and wherein the substrate unit is read at each of the different relative angles while being seated in the holder.

11. A computer program product carrying a computer readable program which can execute a method of claim 4, wherein said computer program product is selected from the group consisting of a memory of a computer, a magnetic diskette, an optical CD or DVD disk and a memory chip.

12. A computer program product according to claim 11 wherein the program additionally determines an audio or visual prompt for a user to rotate the substrate unit in the chemical array unit between readings of the array unit to obtain the different images.

13. A method according to claim 1 wherein the location correction is determined from, or applied to, different detected signals at different image regions acquired from a same substrate displaced at different positions with respect to a focal plane of the reader.

14. A method according to claim 1 additionally comprising acquiring an image from a substrate unit having an area of uniform actual signal covering a planar substrate, and wherein the location correction is determined based on differently located regions in that acquired image.

15. A method according to claim 14 additionally comprising applying the determined location correction to signals from multiple regions of a read array image.

16. A method according to claim 1 wherein the location correction is both determined and applied.

17. A method according to claim 16 wherein the determining and applying the location correction comprises applying a function simultaneously to the different detected signals at different image regions.

18. A method according to claim 17 wherein the function is a mathematical average.

19. A method according to claim 1 wherein the location correction is applied to signals from multiple regions of a read array image.

20. A method according to claim 1 wherein the location correction is determined, the method additionally comprising saving the determined location correction in a memory.

21. A method according to claim 1 wherein the determined or applied location correction varies with location of a region in an image.

22. A method comprising forwarding a result obtained by a method of claim 1 to a remote location.

23. A method comprising receiving a result obtained by a method of claim 1 from a remote location.

24. An array reading system comprising: a chemical array reader; and a processor which receives read signals from the reader and executes a method of claim 1.

25. An array reading system according to claim 24 wherein the chemical array reader comprises: a light source to illuminate a chemical array; and a detector to detect light emitted from different regions of the array in response to the illuminating light.

26. A computer program product carrying a computer readable program which can execute a method of claim 1, wherein said computer program product is selected from the group consisting of a memory of a computer, a magnetic diskette, an optical CD or DVD disk and a memory chip.

* * * * *